US012570861B2

(12) United States Patent (10) Patent No.: US 12,570,861 B2
Ma et al. (45) Date of Patent: Mar. 10, 2026

(54) CURING OF INTUMESCENT COATING COMPOSITIONS BY APPLICATION OF PULSED INFRARED RADIATION

(71) Applicant: PPG Coatings Europe B.V., Amsterdam (NL)

(72) Inventors: Shuang Ma, Nieuw Vennep (NL); Yvan Moestar, The Hague (NL); Marielle Helena Angelina Van Der Linden, Nieuw Vennep (NL); Sven Reil, Großbottwar (DE); Jeffrey M. Parker, East China Township, MI (US); Jeffrey Warzynski, Cranberry Township, PA (US)

(73) Assignee: PPG Coatings Europe B.V., Amsterdam (NL)

( * ) Notice: Subject to any disclaimer, the term of this patent is extended or adjusted under 35 U.S.C. 154(b) by 0 days.

(21) Appl. No.: 18/692,166

(22) PCT Filed: Sep. 16, 2022

(86) PCT No.: PCT/EP2022/075772
§ 371 (c)(1),
(2) Date: Mar. 14, 2024

(87) PCT Pub. No.: WO2023/041708
PCT Pub. Date: Mar. 23, 2023

(65) Prior Publication Data
US 2024/0425708 A1      Dec. 26, 2024

Related U.S. Application Data

(60) Provisional application No. 63/261,273, filed on Sep. 16, 2021.

(51) Int. Cl.
| | |
|---|---|
| *C09D 5/18* | (2006.01) |
| *C09D 7/40* | (2018.01) |
| *C09D 7/61* | (2018.01) |
| *C09D 7/63* | (2018.01) |
| *C09D 163/00* | (2006.01) |
| *H01M 50/383* | (2021.01) |

(52) U.S. Cl.
CPC .............. *C09D 5/185* (2013.01); *C09D 7/61* (2018.01); *C09D 7/63* (2018.01); *C09D 7/70* (2018.01); *C09D 163/00* (2013.01); *H01M 50/383* (2021.01); *H01M 2220/20* (2013.01)

(58) Field of Classification Search
CPC . C09D 5/185; C09D 7/61; C09D 7/63; C09D 7/70; C09D 163/00; H01M 50/383; H01M 2220/20; H01M 10/613; H01M 10/6551; B05D 3/0263; Y02E 60/10
See application file for complete search history.

(56) References Cited

U.S. PATENT DOCUMENTS

| | | | |
|---|---|---|---|
| 5,070,119 A | 12/1991 | Nugent | |
| 5,108,832 A | 4/1992 | Nugent | |
| 2002/0034594 A1* | 3/2002 | Shiveley .............. | B05D 3/0209 |
| | | | 34/523 |
| 2005/0255238 A1 | 11/2005 | Myer et al. | |
| 2016/0333220 A1* | 11/2016 | Walters ................ | C08G 18/792 |
| 2018/0079915 A1 | 3/2018 | Peskens et al. | |
| 2021/0218094 A1 | 7/2021 | Grenier et al. | |

FOREIGN PATENT DOCUMENTS

| | | | | | |
|---|---|---|---|---|---|
| CN | 104893501 A | * | 9/2015 | | |
| CN | 112930386 A | | 6/2021 | | |
| EP | 1690842 A1 | | 8/2008 | | |
| JP | 2018-515645 A | | 6/2018 | | |
| WO | 99/01401 A1 | | 1/1999 | | |
| WO | 2011/015164 A1 | | 2/2011 | | |
| WO | 2016/183147 A1 | | 11/2016 | | |
| WO | WO-2020047059 A1 | * | 3/2020 | ............ | H01M 10/04 |
| WO | WO-2020198424 A1 | * | 10/2020 | .......... | C08G 59/504 |

OTHER PUBLICATIONS

"Fumed Silica also known as Colloidal Silica is a filler often used in epoxy," «https://www.christinedemerchant.com/filler-silica.html», last accessed Jul. 3, 2025 at 2:27 pm. (Year: 2025).*
"Short Wavelength IR (SWIR) Imaging," Infinity Electro-optics, «infinityoptics.com/technology/swir», last accessed Jul. 3, 2025. (Year: 2025).*
Du Yuyang et al: "Pulsed irradiation for high-throughput curing applications", Process in Organic Coatings, Elsevier BV, NL, vol. 104, Dec. 28, 2016, pp. 104-109, XP029905737.
International Search Report and Written Opinion received for PCT Application Serial No. PCT/EP2022/075772 dated Jan. 5, 2023, 8 pages.

* cited by examiner

*Primary Examiner* — William P Fletcher, III

(57) ABSTRACT

The present disclosure relates to a method of imparting fire resistance to a substrate by applying an intumescent coating composition on a surface of a substrate or forming an intumescent coating composition into a self-supporting film or sheet and applying a pulsed infrared radiation to form a cured intumescent coating or a cured self-supporting film or sheet, and applying the self-supporting film or sheet to a part of a surface of the substrate. The present disclosure further relates to the use of an intumescent coating composition and use of pulsed infrared radiation.

20 Claims, 1 Drawing Sheet

(a)

(b)

(c)

(a)

(b)

(c)

(d)

CURING OF INTUMESCENT COATING COMPOSITIONS BY APPLICATION OF PULSED INFRARED RADIATION

TECHNICAL FIELD

The present disclosure relates to a method of imparting fire resistance to a substrate by applying an intumescent coating composition on a surface of a substrate or forming an intumescent coating composition into a self-supporting film or sheet and applying a pulsed infrared radiation to form a cured intumescent coating or a cured self-supporting film or sheet. The present disclosure further relates to the use of an intumescent coating composition and use of pulsed infrared radiation.

TECHNICAL BACKGROUND

Intumescent coatings are widely used in various aspects of daily life and industry. Intumescent coatings are generally applied to the surface of a substrate to change the flaming characteristics of the surface of the substrate, so as to retard the rapid spread of fire. Such coatings offer protection by forming a carbonaceous char upon exposure to intense heat. Numerous substrates may benefit from being coated with intumescent coatings, including batteries such as lithium-ion batteries or structural building components used, for example, in commercial and transportation infrastructures like hotels, airports, concert halls or off-shore sites, chemical plants, oil rigs, and the like, that would be exposed to extreme heat in the case of fire. The methods of curing intumescent coating compositions, however, require a considerable amount of time and energy.

Thus, it is an object of the present disclosure to provide a more efficient process for curing an intumescent coating, which imparts fire resistance to a substrate. It is an object to reduce energy consumption and processing time, while maintaining the fire performances of the cured intumescent coatings.

This object is solved by the subject-matter defined in the appended claims. By applying pulsed infrared radiation to an intumescent coating composition curing times can be reduced significantly and the fire performances of such intumescent coatings are maintained.

SUMMARY

The present disclosure relates to a method of imparting fire resistance to a substrate comprising: (I) (i) applying an intumescent coating composition to a part of a surface of the substrate or (ii) forming an intumescent coating composition into a self-supporting film or sheet; and (II) applying pulsed infrared radiation to (i) the applied intumescent coating composition or to (ii) the self-supporting film or sheet to form a cured intumescent coating or cured self-supporting film or sheet and applying the self-supporting film or sheet to a part of a surface of the substrate.

The present disclosure also relates to a substrate coated according to the method of the present disclosure. In addition, the present disclosure is directed to an article comprising the substrate according to the present disclosure.

The present disclosure further relates to use of intumescent coating composition in a method of curing an intumescent coating composition by applying pulsed infrared radiation.

The present disclosure also relates to use of pulsed infrared radiation in a method of curing an intumescent coating composition.

DETAILED DESCRIPTION

Figure 1:
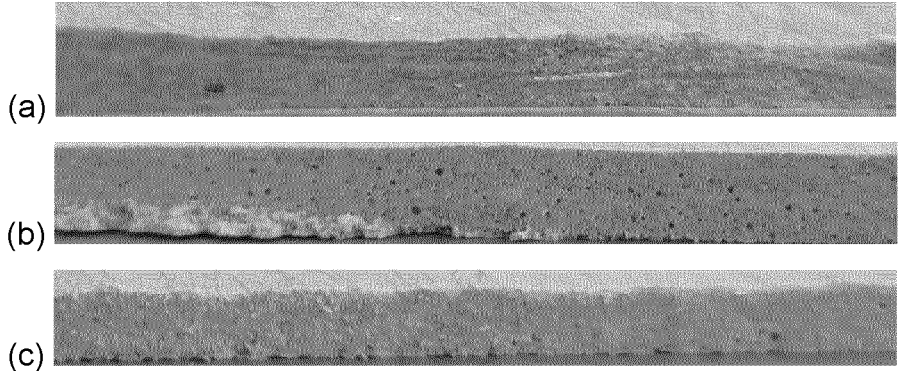
FIG. 1 shows intumescent coatings cured by using pulsed infrared radiation at a distance of 20 cm for 14 min at 50% power (a), at a distance of 30 cm for 7 min at 100% power (b), and by using oven heating at 90° C. for 25 min (c).
Figure 2:
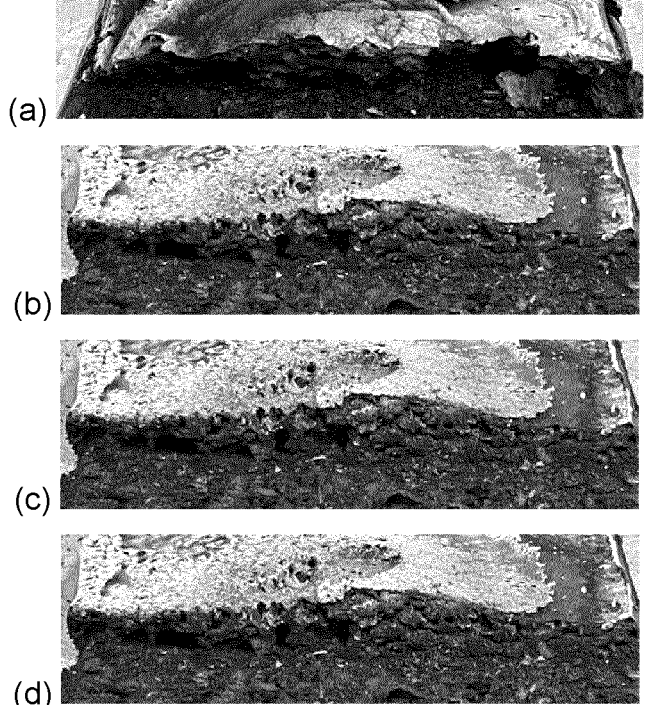
FIG. 2 shows char formation after 5 min at 1200° C. of the intumescent coatings which were cured (a) using oven heating at 90° C. for 120 min, (b) using pulsed infrared radiation at a distance of 20 cm for 30 min at 50% power, (c) using pulsed infrared radiation at a distance of 30 cm for 20 min at 100% power, and (d) at room temperature for 10 days.

For purposes of the following detailed description, it is to be understood that the disclosure may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" polymer, "a" film-forming resin, and the like refer to one or more of any of these items.

The present disclosure relates to a method of imparting fire resistance to a substrate. The method according to the disclosure comprises (I) (i) applying an intumescent coating composition to a part of a surface of the substrate or (ii) forming an intumescent coating composition into a self-supporting film or sheet; and (II) applying pulsed infrared radiation to (i) the applied intumescent coating composition or to (ii) the self-supporting film or sheet to form a cured intumescent coating or cured self-supporting film or sheet and applying the self-supporting film or sheet to a part of a surface of the substrate.

As used herein, the term "intumescent coating" refers to a coating which undergoes swelling, thus leading to an increase in volume and decrease in density, and charring when exposed to heat, such as high temperatures experienced during a fire. The term "self-supporting film or sheet" as used herein refers to a film or sheet which is capable of supporting itself and holding up firm without support of a substrate.

According to the present disclosure, the method of imparting fire resistance to a substrate comprises (I) applying an intumescent coating composition to a part of a surface of the substrate; and (II) applying pulsed infrared radiation to the applied intumescent coating composition to form a cured intumescent coating.

According to the present disclosure, the intumescent coating composition may comprise a film-forming resin (a). As used herein, the term "film-forming resin" refers to resins that can form a self-supporting continuous film on a horizontal surface of a substrate upon removal of any diluents or carriers present in the composition or upon curing at ambient conditions, e.g., at a temperature in the range of 20 to 25° C., or at an elevated temperature, e.g., at a temperature in the range of 40 to 200° C. The terms "resin" and "resinous" and the like are used interchangeably with the terms "polymer" and "polymeric" and the like. Further, the term "polymer" is used herein in its common meaning in the art, referring to macromolecular compounds, i.e., compounds having a relatively high molecular weight (e.g., 500 Da or more), the structure of which comprises multiple repetition units (also referred to as "mers") derived, actually or conceptually, from chemical species of relatively lower molecular mass. Unless indicated otherwise, molecular weights are on a weight average basis ("$M_w$") and are determined by gel permeation chromatography using polystyrene standards.

By ambient conditions is meant that the composition is cured without the aid of heat, for example, without baking in an oven, use of forced air, or the like. Any film-forming resin can be used according to the present disclosure. The film-forming resin can react with itself, that is, undergo a self-crosslinking reaction, or can react with a crosslinker. Accordingly, the intumescent coating composition may further comprise a crosslinking agent (b) suitable for crosslinking the film-forming resin (a). The crosslinking agent comprises functional groups capable to react with the film-forming resin. As used herein, the term "crosslinking" refers to the formation of covalent bonds between polymer chains of the constituent polymer molecules. The terms "crosslinking agent", "curing agent" and "crosslinker" are herein used interchangeably. Curing or crosslinking reactions may be induced, for example, by exposing the coating composition to heat or radiation, but may also be carried out at ambient conditions to form a cured coating.

The type of film-forming resin (a) used in the intumescent coating composition is not particularly limited, such that any known kind of resin can in principle be used. For instance, the film-forming resin (a) may comprise an epoxy resin, an acrylic resin, a polyurethane resin, a polyvinyl resin, an urea-formaldehyde resin, a polyimide resin, a melamine resin, a polyester resin, a cyanate resin, a copolymer thereof or a mixture thereof. According to the present disclosure, the film-forming resin may comprise an epoxy resin, an acrylic resin, a polyurethane resin, a copolymer thereof or a mixture thereof. Particularly, the film-forming resin may comprise an epoxy resin.

The film-forming resin used according to the present disclosure may comprise one or more than one functional group(s) that either react with each other and/or with the functional groups of the crosslinking agent. Examples of suitable functional groups include, but are not limited to, ketone, hydrazide, carbodiimide, oxazoline, epoxy, amine, vinyl, amide, carbamate, urea, mercaptan, carboxylic acid, (meth)acryloyl, isocyanate, alkoxysilyl, anhydride, hydroxyl, alkoxy, and combinations thereof.

Suitable functional groups that are capable of reacting with each other may include, for example, n-methylolamide groups; silane groups having silicone bonded hydrolysable or condensable groups, for example, chloro, hydroxy, alkoxy, acetoxy and/or ketoximo groups; azomethine groups; azetidine groups; and groups capable of thermally reversible Diels-Alder reaction, for example, furan/maleimide. If the film-forming resin contains functional groups that are capable of reacting with each other, it is considered self-crosslinking and the presence of a crosslinking agent is not necessary to be present in the intumescent coating composition.

The film-forming resin may also contain a combination of functional groups that are capable of self-crosslinking and functional groups that are reactive with the functional groups of the crosslinking agent. In such cases, a crosslinking agent may be present; upon cure, two crosslinking mechanisms will occur being the self-crosslinking reaction of the functional groups of the film-forming resin and the reaction between the functional groups of the crosslinking agent and the film-forming resin.

According to the present disclosure, the film-forming resin may comprise an epoxy resin. Suitable epoxy resins may be prepared in a known manner, e.g., by reacting a compound comprising an epoxide functionality and a cyclic co-reactant comprising at least two hydroxyl groups. Examples of suitable compounds comprising one epoxide functionality include, but are not limited to, glycidol; epichlorohydrin; glycidol amines and mixtures thereof. As used herein, the terms "epoxy" and "epoxide" are used interchangeably. Examples of suitable cyclic co-reactants comprising at least two hydroxy groups include, but are not limited to, bisphenol A; hydrated bisphenol A; bisphenol F; hydrated bisphenol F; novolac resins such as phenolic novolac, cresol novolac; and mixtures thereof.

Suitable epoxy resins for use in the present disclosure may comprise a polyepoxide. The polyepoxide typically has at least two 1,2-epoxy groups. The epoxy equivalent weight of the polyepoxide may range from 80 to 600, such as 100 to 700. The epoxy equivalent weight can be determined by potentiometric titration according to ASTM D1652. Epoxy compounds can be saturated or unsaturated, cyclic, aliphatic, alicyclic, aromatic or heterocyclic. The epoxy compounds may comprise substituent(s), such as halogen, hydroxy, and ether groups.

Suitable polyepoxides may include, but are not limited to, polyglycidyl ether of polyphenols, such as, 2,2-bis (4-hydroxyphenyl) propane (bisphenol A), resorcinol, hydroquinone, benzenedimethanol, phloroglucinol, bisphenol F, and catechol; or polyglycidyl ether of polyols. As used herein, the term "polyol" refers to a compound having more than one hydroxyl group per molecule, e.g., 2, 3, 4, 5, 6 or more hydroxyl groups per molecule. Suitable polyols include, but are not limited to alicyclic polyols, such as 1,2-cyclohexane diol, 1,4-cyclohexanve diol, 2,2-bis (4-hydroxycyclohexyl)

propane, 1,1-bis (4-hydroxycyclohexyl) ethane, 2-methyl-1,
1-bis (4-hydroxycyclohexyl) propane, 2,2-bis (4-hydroxy-
3-tert-butylcyclohexyl) propane, 1,3-bis (hydroxymethyl)
cyclohexane and 1,2-bis (hydroxymethyl)cyclohexane, or
aliphatic polyols, such as trihydroxymethylpentane diol,
ethylene glycol, diethylene glycol, triethylene glycol, 1,2-
propylene glycol, 1,4-butyleneglycol, 1,5-pentanediol, 1,2,
6-hexantriol, cyclohexanedimethanol, glycerol, trimethylol-
propane, hydrogenated bisphenol A, hydrogenated
bisphenol F or polyether glycol, for example, poly (oxate-
tramethylene)glycol, poly(oxyethylene)glycol, poly(oxy-
propylene)glycol and neopentane diol.

Further suitable epoxy resins may include, but are not
limited to, polyglycidyl ethers of polycarboxylic acids. As
used herein, the term "polycarboxylic acid" refers to a
compound having more than one carboxylic acid group per
molecule, e.g., 2, 3, 4, 5, 6 or more carboxylic acid groups
per molecule, and includes anhydrides of the corresponding
acid. Suitable polycarboxylic acid may be formed by the
reaction of an epoxy compound such as, epichlorohydrin
with an aliphatic or aromatic polycarboxylic acid, such as,
oxalic acid, succinic acid, glutaric acid, terephthalic acid,
2,6-napthalene dicarboxylic acid, or dimerized linoleic acid.
Such resins are, for example, commercially available from
Hexion Inc. (USA) in the EPIKOTE and EPON lines.

Other suitable epoxy resins that can be used according to
the present disclosure may comprise epoxidized olefinically
unsaturated alicyclic materials, such as epoxy alicyclic
ethers and esters, epoxy resins containing oxyalkylene
groups, epoxy novolac resins, which are prepared by react-
ing an epihalohydrin with the condensation product of an
aldehyde with a monohydric or polyhydric phenol, such as
epoxy phenol novolac resins, or epoxy cresol novolac resins.

It can be advantageous to employ a flexible polyepoxide
resin as a film-forming resin of the intumescent coating
composition. Flexible polyepoxide resins are generally
essentially linear resins, although a small amount of branch-
ing is tolerated. Suitable examples of flexible polyepoxides
include, but are not limited to, epoxidized soybean oil, dimer
acid-based materials such as EPOL 1010 resin commercially
available from BASF (Germany), and rubber-modified poly-
epoxide resins such as the product from a poylgylcidyl ether
of bisphenol A and an acid-functional polybutadiene. Other
suitable examples of flexible polyepoxides may include an
epoxy-functional adduct, which is prepared from a flexible
acid-functional polyester and polyepoxide.

The acid-functional polyester can have an acid value of at
least 10 mg KOH/g, such as 140 to 350 mg KOH/g or 180
to 260 mg KOH/g. The acid value can be determined
according to ASTM D974. Acid-functional polyester can be
prepared by polyesterification of an organic polycarboxylic
acid or anhydride thereof with an organic polyol. The
polycarboxylic acids and polyols can be aliphatic or aro-
matic dibasic acids and diols. Linear polyesters may be more
suitable than branched polyesters.

Suitable polyols that may be used in making the polyester
include, but are not limited to, alkylene glycols, such as
ethylene glycol, diethylene glycol, neopentyl glycol, hydro-
genated bisphenol A, cyclohexanediol, cyclohexanedime-
thanol, carpolactonediol, hydroxy-alkylated bisphenols;
polyether glycols, such as poly(oxytetramethylene)glycol,
poly(oxyethylene)glycol, poly(oxypropylene)glycol and the
like; trimethylolpropane; trimethylolethane; pentaerythritol;
glycerol; isosorbide; tetramethyl cyclobutene diol. Suitable
polycarboxylic acids that may be used in making the poly-
ester may include, but are not limited to, dicarboxylic acids
or anhydrides having 2 to 36 carbon atoms per molecule, such as phthalic acid, isophthalic acid, terephthalic acid,
tetrahydrophthalic acid, hexahydrophthalic acid, adipic acid,
azelaic acid, sebacic acid, maleic acid, glutaric acid, chlo-
rendic acid, tetrachlorophthalic acid, tetrabromophthalic
acid, decanedioic acid, dodecanedioic acid, rosin acid,
diphenolic acid, gallic acid, and other dicarboxylic acids of
varying types, such as Diels-Alder adducts of unsaturated
$C_{18}$ fatty acids. Particularly, a polyester used to make the
epoxy-functional adduct may be prepared from a polycar-
boxylic acid component comprising a polycarboxylic acid
having 7 to 16 carbon atoms and a polyol comprising
diethylene glycol.

Alternatively or additionally, the film-forming resin may
comprise an acrylic resin. Suitable acrylic resins may be
homopolymers or copolymers, which can be obtained by
polymerizing one or more monomers comprising substituted
or unsubstituted (meth)acrylic acids and (meth)acrylates.
Herein, the terms "(meth)acrylic acid" and "(meth)acrylate"
and similar terms refer both to the acrylic acid or acrylate
and the corresponding methacrylic acid or methacrylate,
respectively. Suitable (meth)acrylates can include, but are
not limited to, alkyl (meth)acrylates, cycloalkyl (meth)
acrylates, alkylcycloalkyl (meth)acrylates, aralkyl (meth)
acrylates, alkylaryl (meth)acrylates, aryl (meth)acrylates
and functional groups-containing (meth)acrylates. As used
herein, the term "functional group" refers to a group that
includes one or a plurality of atoms other than hydrogen and
$sp^3$ carbon atoms. Examples of functional groups include,
but are not limited to, hydroxyl, carboxylic acid, amido,
isocyanate, urethane, thiol, amino, sulfone, sulfoxide, phos-
phine, phosphite, phosphate, halide, and the like. Non-
limiting examples of acrylic resins include acrylic resins
derived from methyl (meth)acrylate, ethyl (meth)acrylate,
propyl (meth)acrylate, butyl (meth)acrylate, iso-butyl
(meth)acrylate, 4-methyl-2-pentyl (meth)acrylate, 2-ethyl
hexyl (meth)acrylate, iso-octyl (meth)acrylate, isobornyl
(meth)acrylate, isodecyl (meth)acrylate, lauryl (meth)acry-
late, tridecyl (meth)acrylate, tetradecyl (meth)acrylate,
hexadecyl (meth)acrylate, octadecyl (meth)acrylate, stearyl
(meth)acrylate, benzyl (meth)acrylate, 2-phenoxyethyl
(meth)acrylate, 3,3,5-trimethyl-cyclohexyl (meth)acrylate,
3-methylphenyl (meth)acrylate, 1-naphtyl (meth)acrylate,
3-phenyl-n-propyl (meth)acrylate, 2-phenyl-aminoethyl
(meth)acrylate, hydroxyethyl (meth)acrylate, hydroxypro-
pyl (meth)acrylate, 4-hydroxybutyl (meth)acrylate, glycidyl
(meth)acrylate or combinations thereof.

Suitable acrylic resins may comprise epoxy-functional
acrylic resin. Epoxy-functional acrylic resins can be pre-
pared by free-radical addition polymerization of (meth)
acrylate monomers, optionally in combination with vinyl
monomers or other monomers comprising a carbon-carbon
double bond, wherein the monomer composition comprises
an epoxy-functional compound having a carbon-carbon
double bond.

Suitable epoxy-functional ethylenically unsaturated
monomers include, for example, glycidyl (meth)acrylate,
allyl glycidylether, vinyl glycidylether, vinyl cyclohexene
oxide, limonen oxide, 2-ethylglycidylacrylate, 2-ethylgly-
cidylmethacrylate, 2-(n-propyl)glycidyl (meth)acrylate,
2-(n-butyl) glycidyl (meth)acrylate, glycidylmethyl (meth)
acrylate, (3',4'-epoxyheptyl)-ethyl (meth)acrylate, 6',7'-ep-
oxyheptyl) (meth)acrylate, allyl-3,4-epoxyheptylether, 6,7-
epoxyheptylallylether, vinyl-3,4-epoxyheptylether, 3,4-
epoxyheptylvinylether, 6,7-epoxyheptylvinylether,
o-vinylbenzylglycidylether, m-vinylbenzylglycidylether,
p-vinylbenzylglycidylether, 3-vinyl cyclohexene oxide, alpha-methyl glycidyl methacrylate, 3,4-epoxycyclohexyl-methyl (meth)acrylate and combinations thereof.

In the preparation of the epoxy-functional acrylic resin additional monomers can be employed, such as ethylenically unsaturated nitrile compounds; vinyl aromatic monomers; amides of ethylenically unsaturated acids; ethylenically unsaturated sulfonic acids; ethylenically unsaturated phosphorous-containing acids; vinyl carboxylates; conjugated dienes; monomers having at least two ethylenically unsaturated groups; and combinations thereof.

Suitable examples of ethylenically unsaturated nitrile monomers may include; but are not limited to, aliphatic nitrile monomers that contain from 2 to 4 carbon atoms in a linear or branched arrangement, which may be substituted by acetyl groups. Such nitrile monomers include acrylonitrile, methacrylonitrile, alpha-cyanoethyl acrylonitrile, fumaronitrile and combinations thereof, with acrylonitrile being particularly suitable.

Suitable vinyl-aromatic monomers may include, but are not limited to, styrene, alpha-methylstyrene, p-methylstyrene, t-butylstyrene and vinyltoluene.

Suitable amides of ethylenically unsaturated acids may include, but are not limited to, (meth)acrylamide, and diacetone acrylamide.

Suitable vinyl ester monomers may include, but are not limited to, vinyl acetate, vinyl priopionate, vinyl butyrate, vinyl benzoate, vinyl-2-ethylhexanoate, vinyl stearate, and vinyl esters of versatic acid.

Suitable ethylenically unsaturated carboxylic acid monomers may include, but are not limited to, monocarboxylic acid and dicarboxylic acid monomers and monoesters of dicarboxylic acid. Particularly suitable are ethylenically unsaturated aliphatic mono-or dicarboxylic acids or anhydrides that contain from 3 to 5 carbon atoms. Examples of monocarboxylic acid monomers may include, but are not limited to, (meth)acrylic acid, crotonic acid and examples of dicarboxylic acid monomers may include, but are not limited to, fumaric acid, itaconic acid, maleic acid and maleic anhydride. Examples of other suitable ethylenically unsaturated acids include vinyl acetic acid, vinyl lactic acid, vinyl sulfonic acid, 2-methyl-2-propene-1-sulfonic acid, styrene sulfonic acid, acrylamidomethyl propane sulfonic acid and the salts thereof.

Suitable conjugated diene monomers may include, but are not limited to, 1,3-butadiene, isoprene, 2,3-dimethyl-1,3-butadiene, 2-chloro-1,3-butadiene, 1,3-pentadiene, 1,3-hexadiene, 2,4-hexadiene, 1,3-octadiene, 2-methyl-1,3-pentadiene, 2,3-dimethyl-1,3-pentadiene, 3,4-dimethyl-1,3-hexadiene, 2,3-diethyl-1,3-butadiene, 4,5-diethyl-1,3-octadiene, 3-butyl-1,3-octadiene, 3,7-dimethyl-1,3,6-octatriene, 2-methyl-6-methylene-1,7-octadiene, 7-methyl-3-methylene-1,6-octadiene, 1,3,7-octatriene, 2-ethyl-1,3-butadiene, 2-amyl-1,3-butadiene, 3,7-dimethyl-1,3,7-octatriene, 3,7-dimethyl-dimethyl-1,3,6-octariene, 3,7,11-trimethyl-1,3,6,10-dodecatetraene, 7,11-dimethyl-3-methylene-1,6,10-dodecatriene, 2,6-dimethyl-2,4,6-octatriene, 2-phenyl-1,3-butadiene and 2-methyl-3-isopropyl-1,3-butadiene, 1,3-cyclohexadiene and combinations thereof.

Alternatively or additionally, the film-forming resin may comprise a polyurethane resin. Suitable polyurethane resins can be prepared in a known manner, e.g., by reacting a polyisocyanate and a polyol. As used herein, the term "polyisocyanate" refers to a compound having more than one isocyanate group per molecule, e.g., 2, 3, 4, 5, 6, or more isocyanate groups per molecule. Suitable polyisocyanates include aliphatic polyisocyanates, such as 2,2,4-trimethyl hexamethylene diisocyanate, 2,4,4-trimethyl hexamethylene diisocyanate, 1,6-hexamethylene diisocyanate; cycloaliphatic polyisocyanates, such as isophorone diisocyanate and 4,4'-methylene-bis(cyclohexyl isocyanate); aromatic polyisocyanates such as 4,4'-diphenylmethane diisocyanate, toluene diisocyanate, 1,2,4-benzene triisocyanate, tetramethyl xylylene diisocyanate and polymethylene polyphenyl isocyanate; and combinations thereof. Non-limiting examples of suitable polyols are the polyols as described above. In particular, polyurethanes are suitable which are prepared by reacting polyester polyols or acrylic polyols with a polyisocyanate such that the OH/NCO equivalent ratio is greater than 1:1 so that free hydroxyl groups are present in the product. Suitable polyurethane resins that can be used according to the present disclosure can be exemplified by the reaction product of Desmodur N 3300, which is available from Covestro (Germany), with an alkylene glycol, such as ethylene glycol or propylene glycol.

Alternatively or additionally, the film-forming resin may comprise a polyvinyl resin. Suitable polyvinyl resins may be homopolymers or copolymers, which can be obtained by polymerizing one or more monomers comprising vinyl aromatic compounds, such as styrene and vinyl toluene; nitriles, such as (meth)acrylonitrile; vinyl and vinylidene halides such as vinyl chloride and vinylidene fluoride; and vinyl esters such as vinyl acetate. Suitable polyvinyl resins that can be used according to the present disclosure can be exemplified by vinylic resins under the trademark LUMIFLON™ available from AGC Chemicals Europe, Ltd. (Netherlands).

Alternatively or additionally, the film-forming resin may comprise an urea-formaldehyde resin. Suitable urea-formaldehyde resins may be prepared in a known manner, e.g., by condensation of formaldehyde with urea. Suitable examples of urea-formaldehyde resins may include, but are not limited to urea-formaldehyde resins under the trademark Kaurit®, commercially available from BASF (Germany) and urea-formaldehyde resins under the trademark Casco® Resins, such as Casco® Resin CR-5H commercially available from Hexion Inc. (USA).

Alternatively or additionally, the film-forming resin may comprise a polyimide resin. Suitable polyimide resins may be prepared in a known manner, e.g., by reacting a polyanhydride and a polyamine or by reacting a polyanhydride and a polyisocyanate. Suitable polyanhydrides, and polyisocyanates are as described above. Herein, the term "polyamine" refers to a compound having more than one amine group per molecule, e.g., 2, 3, 4, 5, 6, or more amine groups per molecule. Suitable polyamines include, but are not limited to, aliphatic diamines such as 1,2-ethanediamine, 1,2-propanediamine, 1,3-propanediamine, 1,2-butanediamine, 1,3-butanediamine, 1,4-butanediamine, 1,3-pentanediamine, 1,5-pentanediamine, 1,6-hexanediamine, 2-methyl-1,5-pentanediamine, 2,5-dimethylhexane-2,5-diamine, 2,2,4-trimethyl-1,6-hexanediamine, 2,4,4-trimethyl-1,6-hexanediamine, 1,7-heptanediamine, 1,8-octanediamine, 1,9-nonanediamine, 1,10-decanediamine, 3,3-amino-bis-propylamine, triethylene tetraamine, and tetraethylene pentaamine; cycloaliphatic diamines such as 2,4'-diamino dicyclohexylmethane, 4,4'-diamino dicyclohexylmethane, 3,3'-dimethyl-4,4'-diamino dicyclohexylmethane, isophorone diamine, 1,3-bis(aminoethyl)cyclohexane, bis(4-aminocyclohexyl) methane-aminoethyl piperazine, and 3,3'-diethyl-4,4'-diaminodicyclohexylmethane; and aromatic diamines such as 1,2-benzenediamine, 1,3-benzenediamine, 1,4-benzenediamine, 1,5-naphthalenediamine, 1,8-naphthalenediamine, 2,4-toluenediamine, 2,5-toluenediamine, 2,6- toluenediamine, xylylene diamine, 4,4'-diaminodiphenyl methane, 4,4'-diamino-3,3'-diethyl diphenyl methane, diamino diphenylsulphone and 3,3'-dimethyl-4,4'-biphenyl-diamine; and the reaction product of a polyamine and an aliphatic fatty acid such as the series of materials under the trademark VERSAMID commercially available by BASF (Germany). Suitable examples of polyimide resins may include, but are not limited to, polyimide resins under the trademark Kerimid®, such as 701 A N-70, Kerimid 8292 N-75, and Kerimid 8292 NPM 60, commercially available from Huntsman Corp. (USA).

Alternatively or additionally, the film-forming resin may comprise a melamine resin. Suitable melamine resins may be prepared in a known manner, e.g., by reacting melamine and formaldehyde. Suitable examples of melamine resins may include, but are not limited to, CYMEL 1156 commercially available from Allnex (Germany).

Alternatively or additionally, the film-forming resin may comprise a polyester resin. Suitable polyester resins may be prepared in a known manner, e.g., by condensation of a polyol and a polycarboxylic acid or by ring-opening polymerization of lactones. Non-limiting examples of suitable polyols are the polyols described above and non-limiting examples of polycarboxylic acids are the polycarboxylic acids as described above. Suitable lactones may include, but are to limited to, β-propiolactone; γ-butyrolactone; δ-valerolactone; ε-caprolactone; α-angelica lactone; and mixture thereof. Suitable polyester resins that can be used according to the present disclosure can be exemplified by polyester resins under the trademark SETAL®, such as SETAL® 1715 VX-74, SETAL® 91703 SS-53, and SETAL® 91715 SS-55 commercially available from Allnex Germany GmbH (Germany).

Alternatively or additionally, the film-forming resin may comprise a cyanate resin. Suitable cyanate resins can be exemplified by cyanate resins under the trademark AroCy®, such as AroCy L-10, AroCy XU 366, AroCy 371, or Arocy XU 378, commercially available from Huntsman Corp. (USA).

According to the present disclosure, the film-forming resin can include combinations of epoxy resins and acrylic resins or epoxy resins and polyurethane resins, as for example disclosed in U.S. Pat. Nos. 5,108,832 or 5,070,119.

The intumescent coating composition may comprise the film-forming resin (a) in any suitable amount. For example, the intumescent coating composition may comprise 5 wt. % or greater of the film-forming resin (a), such as 8 wt. % or greater, or 10 wt. % or greater, or 12 wt. % or greater, or 15 wt. % or greater. The intumescent coating composition may, for example, comprise 40 wt. % or less of the film-forming resin, such as 35 wt. % or less, or 32 wt. % or less, or 30 wt. %, or less, or 28 wt. % or less, or 25 wt. % or less. The intumescent coating composition can, for example, comprise the film-forming resin (a) in an amount in a range between any of the above-mentioned values such as from 5 to 40 wt. %, or from 8 to 35 wt. %, or from 10 to 35 wt. %, or from 10 to 30 wt. %, or from 10 to 28 wt. %, or from 12 to 25 wt. %. The weight percentages are based on total solid weight of the intumescent coating composition.

As noted above, the intumescent coating composition may also comprise a crosslinking agent (b). Any suitable crosslinking agent (b) can be used according to the present disclosure, and will be chosen by one skilled in the art to react with the functional groups of the film-forming resin. According to the present disclosure, the crosslinking agent (b) may comprise a polyamine, such as a polyetheramine, a polyamide, a polyepoxide, an aminoplast resin, a phenolic resin, a polyisocyanate, a polythiol, a polyol, a copolymer thereof or a mixture thereof. The crosslinking agent (b) particularly may comprise polyamine.

The crosslinking agent may be a latent or blocked crosslinking agent, wherein the functional group of the crosslinking agent that is reactive with the functional group of the film-forming resin is generated or restored in a deblocking reaction at curing conditions such as elevated temperatures, e.g., temperatures above 120° C. Suitable crosslinking agent of such type are, for example, blocked polyisocyanate. As used herein, the term "polyisocyanate" is intended to include blocked polyisocyanates as well as free polyisocyanates. Latent or blocked crosslinking agents are particularly suitable to provide single component compositions to secure sufficient storage stability and pot life prior to application and curing. Examples of suitable blocking agents include those materials which would unblock at elevated temperatures, e.g., at temperatures above 120° C., such as lower aliphatic alcohols having 1 to 6 carbon atoms including methanol, ethanol, and n-butanol; cycloaliphatic alcohols such as cyclohexanol; aromatic alkyl alcohols such as phenyl carbinol and methylphenyl carbinol; and phenolic compounds such as phenol itself and substituted phenols wherein the substituents do not affect coating operations, such as cresol and nitrophenol. Glycol ethers may also be used as blocking agents. Suitable glycol ethers include ethylene glycol butyl ether, diethylene glycol butyl ether, ethylene glycol methyl ether and propylene glycol methyl ether. Other suitable blocking agents include oximes such as methyl ethyl ketoxime, acetone oxime and cyclohexanone oxime, lactams such as epsilon-caprolactam, pyrazoles such as dimethyl pyrazole, and amines such as dibutyl amine.

The crosslinking agent (b) may comprise a polyamine. Herein, the term "polyamine" refers to a compound having more than one amine group per molecule, e.g., 2, 3, 4, 5, 6, or more amine groups per molecule. Suitable crosslinking agents may include, for example, aliphatic polyamines, aromatic polyamines, polyamine amides, polyether amines, polysiloxane amines, polysulfide amines or combinations thereof.

Suitable polyamines include, but are not limited to, aliphatic diamines such as 1,2-ethanediamine, 1,2-propanediamine, 1,3-propanediamine, 1,2-butanediamine, 1,3-butanediamine, 1,4-butanediamine, 1,3-pentanediamine, 1,5-pentanediamine, 1,6-hexanediamine, 2-methyl-1,5-pentanediamine, 2,5-dimethylhexane-2,5-diamine, 2,2,4-trimethyl-1,6-hexanediamine, 2,4,4-trimethyl-1,6-hexanediamine, 1,7-heptanediamine, 1,8-octanediamine, 1,9-nonanediamine, 1,10-decanediamine, 3,3-amino-bis-propylamine, triethylene tetraamine, and tetraethylene pentaamine; cycloaliphatic diamines such as 2,4'-diamino dicyclohexylmethane, 4,4'-diamino dicyclohexylmethane, 3,3'-dimethyl-4,4'-diamino dicyclohexylmethane, isophorone diamine, 1,3-bis(aminoethyl)cyclohexane, bis(4-aminocyclohexyl) methane-aminoethyl piperazine, and 3,3'-diethyl-4,4'-diaminodicyclohexylmethane; and aromatic diamines such as 1,2-benzenediamine, 1,3-benzenediamine, 1,4-benzenediamine, 1,5-naphthalenediamine, 1,8-naphthalenediamine, 2,4-toluenediamine, 2,5-toluenediamine, 2,6-toluenediamine, xylylene diamine, 4,4'-diaminodiphenyl methane, 4,4'-diamino-3,3'-diethyl diphenyl methane, diamino diphenylsulphone and 3,3'-dimethyl-4,4'-biphenyl-diamine; and the reaction product of a polyamine and an aliphatic fatty acid such as the series of materials under the trademark VERSAMID commercially available by BASF (Germany).

In addition, adducts of any above polyamines can be used. The adduct of polyamine can be formed by reacting a polyamine with a suitable reactive compound, such as an epoxy resin. This reaction will decrease the content of free amine in the curing agent, making it more useful at low temperature and/or high humidity environment.

According to the present disclosure, the polyamine may include a polyetheramine, such as Jeffamines commercially available from Huntsman Corp. (USA), including, but not limited to, Jeffamine D-230, Jeffamine D-400, Jeffamine 600, Jeffamine 1000, Jeffamine 2005 and Jeffamine 2070.

Alternatively or additionally, the crosslinking agent (b) may comprise a polyamide. Suitable polyamides may be prepared by reacting polyamines and polycarboxylic acid or by ring-opening polymerization of lactams. Non-limiting examples of suitable polyols are the polyols as described above and non-limiting examples of suitable polyamines are the polyamines as described above. Suitable lactams may include, but are not limited to, β-propiolactam; γ-butyro-lactam; δ-valerolactam; ε-caprolactam; and mixture thereof. In particular, polyamides may contain reaction products of dimer fatty acid and polyethyleneamine, and small amounts of monomer fatty acid. Dimer fatty acid is prepared by the oligomerization of monomer fatty acid. Polyethyleneamine can be any higher polyethyleneamine, such as diethylenetri-amine, triethylenetetramine, tetraethylenepentaamine, wherein the most commonly used is diethylenetriamine. When polyamides are used as crosslinking agent, it may impart one or more desirable properties to the intumescent coating, such as corrosion resistance, water resistance and/or good flexibility.

Alternatively or additionally, the crosslinking agent (b) may comprise a polyepoxides. Non-limiting examples of suitable polyepoxides are the polyepoxides as described above.

Alternatively or additionally, the crosslinking agent (b) may comprise an aminoplast resin. Suitable aminoplast resins can be obtained from the condensation reaction of an aldehyde, such as formaldehyde, with a compound compris-ing at least two amine or amide groups per molecule. Suitable examples of aldehydes include, but are not limited to, formaldehyde, acetaldehyde, crotonaldehyde and benz-aldehyde. Suitable examples of compounds comprising at least two amine or amide groups include, but are not limited to, melamine, urea and benzoguanamine. Suitably, the ami-noplast resins may be etherified, typically, with an alcohol, such as methanol, ethanol, butanol or mixtures thereof. Suitable aminoplast resins that can be used according to the present disclosure can be exemplified by Maprenal® Amino Resin, such as Maprenal MF 612/70B, Maprenal MF 613/71B and Maprenal MF 650/55IB commercially available from Prefere Resin Holding GmbH (Germany), Cymel® Amino Crosslinkers, such as Cymel 303, Cymel 202, Cymel 1161, Cymel 325 and Cymel 1133 commercially available from Allnex Industries (Germany); Setamine® aminoresins, such as Setamine US-138 BB-70, and Setamine US-146 BB-72 commercially available from Allnex (Germany).

Alternatively or additionally, the crosslinking agent (b) may comprise an phenoplast resin. Suitable phenoplast resins can be obtained by either acid-catalyzed (novolaks) or base-catalyzed (resoles) addition polymerization of phenol with formaldehyde. Suitable phenoplast resins that can be used according to the present disclosure can be exemplified by EPON™ Epoxy Novolac resin, such as EPON™ Resin SU-8commercially available from Hexion Inc. (USA).

Alternatively or additionally, the crosslinking agent (b) may comprise a polyisocyanate. Non-limiting examples of suitable polyisocyanates are the polyisocyanates as described above.

Alternatively or additionally, the crosslinking agent (b) may comprise a polythiol. Suitable polythiols may include, but are not limited to polysulfide thiols, polyether thiols, polyester thiols, pentaerythritol based thiols, or combina-tions thereof. A particular suitable polythiol is Thioplast G4, commercially available from Akzo Nobel Functional Chemicals GmbH&Co. KG (Germany).

Alternatively or additionally, the crosslinking agent (b) may comprise a polyol. Non-limiting examples of suitable polyols are the polyols as described above.

As mentioned above, if the film-forming resin (a) com-prises an epoxy resin the crosslinking agent (b) comprises a polyamine, a polythiol or a combination thereof; in particu-lar, if the film-forming resin (a) comprises an epoxy resin the crosslinking agent (b) comprises a polyamine.

The intumescent coating composition may comprise the crosslinking agent (b) in any suitable amount. For example, the intumescent coating composition may comprise 5 wt. % or greater of the crosslinking agent (b), such as 8 wt. % or greater, or 10 wt. % or greater, or 12 wt. % or greater, or 15 wt. % or greater. The intumescent coating composition may, for example, comprise 40 wt. % or less of the film-forming resin, such as 35 wt. % or less, or 32 wt. % or less, or 30 wt. % or less, or 28 wt. % or less, or 25 wt. % or less. The intumescent coating composition can, for example, com-prise the crosslinking agent (b) in an amount in a range between any of the above-mentioned values such as from 5 to 40 wt. %, or from 8 to 35 wt. %, or from 10 to 35 wt. %, or from 10 to 30 wt. %, or from 10 to 28 wt. %, or from 12 to 25 wt. %. The weight percentages are based on total solid weight of the intumescent coating composition.

The intumescent coating composition may further com-prise (c) a compound providing an expansion gas upon thermal decomposition. The expansion gas serves to cause the intumescent composition to foam and swell when exposed to high temperature, such as temperatures greater than 150° C., or flames. As a result of this expansion, the char that is formed is a thick, multicelled material that serves to insulate and protect the underlying substrate. Any suitable source of expansion gas may be used in the intumescent composition of the present disclosure, such as a nitrogen-containing material. Suitable nitrogen-containing materials include, but are not limited to melamine, salts of phosphoric acid, guanidine, methylolated melamine, hexamethoxym-ethyl melamine, urea, dimethylurea, melamine pyrophos-phate, dicyandiamide, guanylurea phosphate and glycine. Other conventional sources of expansion gas can also be used such as those materials that liberate carbon dioxide. Suitable examples of materials that liberate carbon dioxide are alkaline earth metals such as calcium carbonate or magnesium carbonate. Compounds that release water vapor as they decompose upon heating such as, for example, calcium hydroxide, magnesium dihydroxide or aluminum trihydroxide, may also be used, as can expandable graphite. Other examples of such compounds are also borate sources, such as boric acid and boric acid derivatives such as boric acid esters and metal borates. In particular, the compound providing an expansion gas upon thermal decomposition (c) may comprise melamine, melamine derivatives, guanidine, methylolated melamine, hexamethoxymethyl melamine, urea, dimethylurea, melamine pyrophosphate, dicyandi-amide, guanylurea phosphate, glycine, alkaline earth metal carbonate, calcium hydroxide, magnesium dihydroxide, aluminum trihydroxide, expandable graphite or a mixture thereof.

For example, the compound providing an expansion gas upon thermal decomposition (c), such as melamine, may be used in the intumescent coating composition of the present disclosure in an amount of 1 wt. % or greater, such as 2 wt. % or greater, or 3 wt. % or greater. The compositions according to the present disclosure can comprise the compound providing an expansion gas upon thermal decomposition (c), for example, in an amount of 10 wt. % or less, or 8 wt. % or less, or 7 wt. % or less, or 5 wt. % or less. The composition may comprise the compound providing an expansion gas upon thermal decomposition (c) in an amount in a range between any of the above-mentioned values such as from 1 to 10 wt. %, or from 2 to 7 wt. %. The weight percentages are based on the total solid weight of the intumescent coating composition.

The intumescent coating composition of the present disclosure particularly comprises (a) a film-forming resin, (b) a crosslinking agent, and (c) a compound providing an expansion gas upon thermal decomposition. According to the present disclosure, compounds (a) to (c) differ from each other.

The intumescent coating composition of the present disclosure may further comprise an epoxy reactive diluent. Suitably, the epoxy reactive diluent is operable to lower the viscosity of the composition.

Suitable epoxy reactive diluents may be produced by any suitable method. Such epoxy reactive diluents may be formed from the reaction of a compound comprising an aliphatic epoxide functionality such as diglycidyl ether with an aliphatic alcohol or polyol. Examples of suitable compounds comprising an epoxide functionality may include, but are not limited to, monoglycidyl ether; diglycidyl ether; triglycidyl ether and mixtures thereof. Examples of suitable alcohols and polyols may include, but are not limited to, hexanediol; butanediol; glycerol; trimethylolpropane; trimethylolethane; pentaerythritol; neopentyl glycol and mixtures thereof. In particular, the epoxy reactive diluent may comprise a diglycidyl ether of an aliphatic alcohol. Suitably, the epoxy reactive diluent may comprise a diglycidyl ether of hexanediol and/or a diglycidyl ether of neopentyl glycol.

The intumescent coating composition of the present disclosure may comprise the reactive epoxy diluent, if present, in an amount of 1 wt. % or greater, such as for example 2 wt. % or greater, or 3 wt. % or greater, or 4 wt. % or greater, 5 wt. % or greater, or 6 wt. % or greater. The intumescent coating composition may comprise the reactive epoxy diluent, if present, in an amount of 30 wt. % or less, such as 20 wt. % or less, or 15 wt. % or less, or 10 wt. % or less. The intumescent coating composition may comprise the reactive epoxy diluent, if present, in an amount in a range between any of the above-mentioned values such as from 1 to 30 wt. %, for example from 2 to 20 wt. %, or from 3 to 15 wt. %, or from 5 to 10 wt. %. The weight percentages are based on the total solid weight of the intumescent coating composition.

The intumescent coating compositions of the present disclosure may further comprise a phosphate compound. The term "phosphate compound" as used herein refers to any phosphorus-containing material, which comprises phosphoric acid or condensation or dehydration products (including oxides) thereof, or salts, esters, amides or other derivatives of any of the foregoing. The phosphate compound can comprise a variety of materials, such as, for example, phosphoric acid, mono-and diammonium phosphate, triphenyl phosphate, tris-(2-chloroethyl) phosphate, tris-(2-chloroisopropyl)phosphate, ammonium polyphosphate, melamine pyrophosphate, and combinations thereof. The ammonium polyphosphate may be represented by the formula $(NH_4)_{n+2} P_n O_{3n+1}$, wherein n is an integer of at least 2, suitably n is an integer of at least 50.

The intumescent coating composition of the present disclosure may comprise the phosphate compound, if present, in an amount of 15 wt. % or greater, such as for example 20 wt. % or greater, or 25 wt. % or greater, or 30 wt. % or greater, 35 wt. % or greater, or 40 wt. % or greater. The intumescent coating composition may comprise the phosphate compound, if present, in an amount of 55 wt. % or less, such as 50 wt. % or less, or 45 wt. % or less, or 40 wt. % or less, or 35 wt. % or less. The intumescent coating composition may comprise the phosphate compound, if present, in an amount in a range between any of the above-mentioned values such as from 15 to 55 wt. %, for example from 20 to 50 wt. %, or from 25 to 40 wt. %, or from 40 to 55 wt. %. The weight percentages are based on the total solid weight of the intumescent coating composition. The phosphorous is believed to function as a char promoter in the intumescent composition.

The intumescent coating compositions of the present disclosure may further comprise a borate compound. The term "borate compound" as used herein refers to any boron-containing material which contains boric acid, or condensation or dehydration products (including oxides) thereof, or salts or esters of any of the foregoing. According to the disclosure, the borate compound may comprise ammonium pentaborate, boric acid, metal borates such as zinc borate, boron oxide, sodium borate, potassium borate, ammonium borate, borate esters such as butyl borates or phenyl borates or a mixture thereof.

The intumescent coating composition of the present disclosure may comprise the borate compound, if present, in an amount of 5 wt. % or greater, such as 6 wt. % or greater, or 7 wt. % or greater, or 8 wt. % or greater, or 9 wt. % or greater, or 10 wt. % or greater. The intumescent coating composition may comprise the borate compound, if present, in an amount of 35 wt. % or less, such as 30 wt. % or less, or 25 wt. % or less, or 20 wt. % or less. The intumescent coating composition may comprise the borate compound, if present, in an amount in a range between any of the above-mentioned values such as from 5 to 35 wt. %, or from 5 to 30 wt. %, or from 9 to 15 wt. %. The weight percentages are based on total solid weight of the intumescent coating composition.

The intumescent coating compositions of the present disclosure may further comprise an aluminum compound. The term "aluminum compound" as used herein refers to any aluminum-containing materials. Typically, the aluminum compound may comprise an inorganic aluminum compound. Suitable aluminum compounds may comprise aluminum hydroxide, aluminum oxide (alumina), aluminum salts, such as aluminum chloride and combinations thereof. For instance, the aluminum compound can comprise aluminum hydroxide and/or aluminum oxide.

The intumescent coating composition of the present disclosure may comprise the aluminum compound, if present, in an amount of 0.1 wt. % or greater, such as 0.2 wt. % or greater, or 0.3 wt. % or greater, or 0.5 wt. % or greater, or 1 wt. % or greater, or 3 wt. % or greater, or 5 wt. % or greater. The intumescent coating composition may comprise the aluminum compound, if present, in an amount of 10 wt. % or less, such as 9 wt. % or less, or 8 wt. % or less, or 5 wt. % or less, or 3 wt. % or less, or 1 wt. % or less, or 0.7 wt. % or less. The intumescent coating composition may comprise the aluminum compound, if present, in an amount in a range between any of the above-mentioned values such as from 0.1 to 10 wt. %, or from 0.2 to 8 wt. % or from 0.3 to 1 wt. %. The weight percentages are based on total solid weight of the intumescent coating composition.

The intumescent coating compositions of the present disclosure may further comprise a silica compound. The term "silica compound" as used herein refers to any silicon-containing material which contains silicic acid, condensation or dehydration products (including oxides) thereof or salts or esters of any of the foregoing. Suitable silica compounds may comprise fumed silica or quartz or a substance that contains silica such as bentone or kaolin, or a mixture thereof.

The intumescent coating composition of the present disclosure may contain the silica compound, if present, in an amount of 0.1 wt. % or greater, such as 0.2 wt. % or greater, or 0.3 wt. % or greater, or 0.4 wt. % or greater, or 0.5 wt. % or greater. The intumescent coating composition may comprise the silica compound, if present, in an amount of 5 wt. % or less, such as 3 wt. % or less, or 2 wt. % or less, or 1 wt. % or less, or 0.8 wt. % or less. The intumescent coating composition may comprise the silica compound, if present, in an amount in a range between any of the above-mentioned values such as from 0.1 to 5 wt. %, or from 0.4 to 1 wt. %. The weight percentages are based on total solid weight of the intumescent coating composition.

The intumescent coating compositions of the present disclosure may comprise a borate compound, an aluminum compound or a silica compound. The intumescent coating compositions of the present disclosure can thus for example contain one of a borate compound, an aluminum compound or a silica compound. For example, the intumescent coating composition can comprise a borate compound. Alternatively, the intumescent coating composition can comprise an aluminum compound or a silica compound. On the other hand, the intumescent coating compositions can also comprise a combination of two or more of a borate compound, an aluminum compound, and/or a silica compound. For example, the intumescent coating composition according to the present disclosure can comprise an aluminum compound and a silica compound, or a borate compound and an aluminum compound, or a borate compound and a silica compound. The intumescent coating composition may comprise a borate compound, an aluminum compound and a silica compound.

The intumescent coating compositions of the present disclosure may further comprise titanium dioxide (TiO$_2$). The intumescent coating composition according to the present disclosure may comprise the TiO$_2$, if present, in an amount of 5 wt. % or greater, such as 6 wt. % or greater, or 7 wt. % or greater, or 8 wt. % or greater, or 9 wt. % or greater, or 10 wt. % or greater. The intumescent coating composition may comprise the TiO$_2$, if present, in an amount of 20 wt. % or less, such as 19 wt. % or less, or 18 wt. % or less, or 17 wt. % or less, or 15 wt. % or less, or 13 wt. % or less, or 10 wt. % or less. The intumescent coating composition may comprise the TiO$_2$, if present, in an amount in a range between any of the above-mentioned values such as from 5 to 20 wt. %, or from 5 to 10 wt. %, or from 10 to 18 wt. %. The weight percentages are based on total solid weight of the intumescent coating composition.

In particular, the intumescent coating composition may comprise a borate compound, an aluminum compound or a silica compound in conjunction with TiO$_2$ and a phosphate source, in the ranges given above. Such intumescent coating composition particularly give an intumescent coating having desirable char formation in conjunction with desirable adhesion to the substrate. By "desirable char formation" is meant the char cannot be easily cracked or removed by direct flame blow and the expansion coefficient, which is the ratio between thickness of char and thickness of coating film, may be from 5 to 25, such as from 7 to 20. By "desirable adhesion" is meant that the char will substantially remain intact during a direct flame blow, and no obvious detachment of char from the substrate occurs during or after a fire test.

According to the present disclosure, the intumescent coating composition can be applied to a part of a surface of a substrate by any means standard in the art, such as electrocoating, spraying, electrostatic spraying, dipping, rolling, brushing, and the like. The intumescent coating composition of the present disclosure may be applied to provide various dry film thicknesses ("DFT") as desired. The intumescent coating composition can be applied to a part of a surface of the substrate to obtain a dry coating thickness ranging from 0.1 to 15 mm, such as from 0.2 to 14 mm, or from 0.5 to 13 mm, or from 0.5 to 12 mm, or from 0.7 to 10 mm. The thickness can be determined according to DIN EN ISO 2178:2016. As used herein, the "dry coating thickness" is the thickness of a coating, which is applied to a part of a surface of a substrate, measured above the substrate after the coating is cured. The desired dry film thickness ("DFT") can vary depending on the application. For use on building structural components a DFT ranging from 0.1 to 15 mm, such as 0.3 to 1 mm or 3 to 15 mm may be suitable. For use on lithium batteries, a DFT ranging from 0.2 to 5 mm, such as 0.2 to 1 mm or 1 to 5 mm may be suitable.

Alternatively, the intumescent coating composition of the present disclosure is formed into a self-supporting film or sheet. In general, the intumescent coating composition of the present disclosure can be formed into a film or sheet by any technique well known to a person skilled in the art, for example a cast molding process, by impregnating a mesh with the coating, and the like. The film or sheet can be cured to form a cured intumescent self-supporting film or sheet prior to the application of the cured intumescent self-supported film or sheet to a substrate. It is also within the ambit of the present disclosure that after the forming step the uncured film or sheet is applied to a substrate and then subsequently cured to obtain the cured intumescent layer according to the present disclosure. The film or sheet may be applied to the substrate through an adhesive. The intumescent coating composition can be formed into a self-supporting film or sheet having a dry film thickness ranging from 0.1 to 15 mm, such as from 0.2 to 14 mm, or from 0.5 to 13 mm, or from 0.5 to 12 mm, or from 0.7 to 10 mm.

The intumescent coating composition of the present disclosure may further comprise one or more additional additives suitable for use in intumescent coatings. Examples of such additives include a zinc source, an acid source, a reinforcing filler, a carbon source, inorganic fillers, rheology additives, organic solvents, pigments, foam stabilizers, and combinations thereof.

The zinc source may contribute to the formation of a small-celled structure in the char. The small cells of the char may afford better insulation of the substrate and are better able to retain the char's integrity and adhere to the substrate. Thus, cracking of the char and its breaking away from the substrate are minimized and a greater measure of protection is afforded to the underlying substrate. Suitable examples of zinc source may include, but is not limited to, zinc oxide, zinc salts, such as zinc borate and zinc phosphate, zinc carbonate; and zinc metal.

Suitable examples of an acid source may include, but is not limited to, ammonium phosphate, ammonium polyphosphate, diammonium diphosphate, diammonium pentaborate, phosphoric acid-generating materials, boric acid, metal or organic borates and combinations thereof.

It should be understood that many of the components of the present intumescent coating composition may serve more than one function in the composition. For example, the phosphorus compound, zinc source, borate compound and compound providing an expansion gas upon thermal decomposition can each be provided by a separate source material or, alternatively, a single material may be a source of more than one of these components. For example, melamine pyrophosphate can provide a source of both phosphorus and expansion gas, zinc borate can provide a source of zinc and a source of borate; zinc phosphate may provide a source of zinc and a source of phosphate, and the like.

The reinforcing fillers may be chosen from among a large array of conventionally utilized materials, including fibrous reinforcements and platelet reinforcements, which may be suitable over other fillers. Examples of fibrous reinforcements include glass fibers, ceramic fibers, e.g., aluminum oxide/silicon oxide, graphite fibers, mineral fibers and basalt fibers. Platelet reinforcements include hammer-mill glass flakes, mica, and wollastonite. Other suitable fillers include metal oxides, clay, talc, silica, diatomaceous earth, LAPINUS fibers and various pigments. The reinforcing filler is believed to assist in controlling expansion of the fire-protective composition prior to and during char formation so that the resultant char is hard and uniform. When present, the reinforcing filler, such as glass fibers and/or mineral fibers, is usually present in the intumescent coating composition in an amount of 5.0 wt. % or less, such as 4 wt. % or less, such as 3 wt. % or less. The intumescent coating composition according to the present disclosure can for example comprise the reinforcing filler in an amount of 0.1 wt. % or greater, such as 0.2 wt. % or greater, 0.5 wt. % or greater, or 1 wt. % or greater. The intumescent coating composition may comprise the reinforcing filler in an amount in a range between any of the above-mentioned values such as from 0.1 to 5.0 wt. %, or from 1 to 4 wt. %. The weight percentages are based on total solid weight of the intumescent coating composition.

The intumescent coating compositions of the present disclosure may further comprise fibrous reinforcements. According to the present disclosure, fibrous reinforcements may comprise mineral fibers, ceramic fibers, glass fibers, carbon fibers, basalt fibers, or a mixture thereof. The intumescent coating composition according to the present disclosure may comprise the fibrous reinforcements, if present, in an amount of 0.1 wt. % or greater, such as 0.2 wt. % or greater, or 0.5 wt. % or greater, or 0.7 wt. % or greater, or 1 wt. % or greater, or 1.5 wt. % or greater. The intumescent coating composition may comprise the fibrous reinforcements, if present, in an amount of 5.0 wt. % or less, such as 4.5 wt. % or less, or 4.0 wt. % or less, or 3.5 wt. % or less, or 3.0 wt. % or less, or 2.5 wt. % or less. The intumescent coating composition may comprise the fibrous reinforcements, if present, in an amount in a range between any of the above-mentioned values such as from 0.5 to 5.0 wt. %, or from 0.7 to 4.0 wt. %, or from 1.0 to 3.0 wt. %. The weight percentages are based on total solid weight of the intumescent coating composition.

The intumescent coating composition of the present disclosure may also contain a variety of conventional additives, such as rheology additives, organic solvents, foam stabilizers, pigments, flame spread control agents, and the like. These ingredients are optional and can be added in varying amounts. Typically, if additional additives are used, they are present in a total amount of 1 wt. % or greater, such as 2 wt. % or greater, or 5 wt. % or greater, or 10 wt. % or greater. The additional additives, if present, can for example be present in the intumescent coating composition according to the present disclosure in an amount of 20 wt. % or less, such as 15 wt. % or less, or 12 wt. % or less. The intumescent coating composition may comprise the optional additional additives in an amount in a range between any of the above-mentioned values such as from 1 to 20 wt. %, such as 2 to 20 wt. %, or 5 to 15 wt. %. The weight percentages are based on total solid weight of the intumescent coating composition.

The intumescent coating composition may be either one component ("1K"), or multi-component compositions such as two component ("2K") or more. As used herein, a "1K composition" refers to a composition wherein all the coating components are maintained in the same container after manufacture, during storage, etc. A 1K composition can be applied to a substrate and cured by any conventional means, such as by heating, forced air, and the like. The intumescent coating composition can also be multi-component, which will be understood as compositions in which various components are maintained separately until just prior to application. For example, the present compositions might be packaged as a 2K system, with the film-forming resin in a first package (A) and a crosslinking agent therefore in a second package (B), whereby all of the other components used in the coating composition are used in any combination in either package (A) or package (B) or in both, or some or all may be in one or more further packages (C). The individual packages are mixed prior to use of the intumescent composition. In particular, the intumescent coating composition may be a two-component ("2K") coating composition.

The intumescent coating composition may be in the form of a thick material such as a mastic. It is particularly suitable that the composition is solvent-free and spray-applied. If desired, thinning can be accomplished with a variety of conventional solvents such as, xylene, methylene chloride or 1,1,1-trichloroethane.

The intumescent coating compositions can be applied by any means standard in the art, such as electrocoating, spraying, electrostatic spraying, dipping rolling, brushing, and the like, including application robotically.

As mentioned above, in the method of the present disclosure the intumescent coating composition is cured by applying pulsed infrared radiation. As used herein, the term "pulsed" refers to radiation that is emitted in time-limited portions (the pulses). The term "infrared radiation" refers to electromagnetic radiation having a wavelength in the range of 780 nm to 1 mm. Accordingly, the term "pulsed infrared radiation" refers to electromagnetic radiation having a wavelength in the in the infrared spectral range, which is applied in pulses. The pulses have a pulse duration at a pulse frequency.

The terms "cure", "cured" or similar terms, as used in connection with the intumescent coating composition described herein, means that at least a portion of the components that form the coating composition is cured to form a coating. The pulsed infrared radiation may be applied to the intumescent coating composition to form an at least partially cured intumescent coating or an at least partially cured intumescent film or sheet. As used herein, the term "at least partially cured" means that the reaction of at least a portion of the reactive groups of the components of the intumescent coating composition occurs. According to the present disclosure, the pulsed infrared radiation may be applied to the intumescent coating composition to form a full cured intumescent coating or full cured intumescent film or sheet. Full cure is attained when further curing results in no significant further improvement in the coating properties, such as the hardness of the cured coating or the cured self-supporting film or sheet. Hardness of the cured coating or the cured self-supporting film or sheet can be determined by the Shore hardness, such as by determining, for example, the Shore D hardness at room temperature using a Shore D durometer in a range of 40 to 90 or the Shore A hardness at room temperature using a Shore A durometer of at least 50.

According to the present disclosure, the pulsed infrared radiation may be applied for a time of less than 50 min, or less than 40 min, or less than 35 min, or less than 30 min, or less than 25 min, or less than 20 min, or less than 15 min, or less than 10 min to form a cured coating or a cured self-supporting film or sheet. According to the present disclosure, the pulsed infrared radiation may be applied for a time of at least 2 min, or at least 4 min, or at least 5 min, or at least 6 min, or at least 8 min to form a cured coating or a cured self-supporting film or sheet. According to the present disclosure, the pulsed infrared radiation may be applied in a range between any of the above-mentioned values such as from 2 min to 50 min, or from 2 min to 35 min, or from 2 min to 30 min, or from 4 min to 25 min, or from 5 min to 20 min, or from 6 to 15 min, or from 8 min to 10 min to form a cured coating or a cured self-supporting film or sheet. In comparison with curing intumescent coating compositions in an oven shorter curing times can be achieved resulting in energy savings. The method further provides high efficiency, as the infrared radiators are active shortly after switching on, without a long preheating period, and only desired partial areas are heated, e.g., the substrate having applied the intumescent coating composition.

Using pulsed infrared radiation, the transfer of energy to the coating composition is not primarily realized by thermal convection or thermal conduction, but by non-visible electromagnetic waves in the infrared spectral range at the speed of light, because electromagnetic waves propagate in the same way and at the same speed as light waves. Infrared radiation penetrates quickly and effectively into the surface of the substrate and ensures rapid curing of the applied intumescent coating composition or the formed self-supporting film or sheet. This enables the transfer of a radiation with high energy density and thus an energetically highly efficient curing of the coating composition according to the present disclosure. Faster and more energy-efficient curing at low temperatures can be achieved.

According to the present disclosure, the surface temperature of the substrate during applying the pulsed infrared radiation in (II) to the applied intumescent coating composition to form a cured intumescent coating can be less than 100° C., or less than 90° C. According to the present disclosure, the surface temperature of the substrate during applying the pulsed infrared radiation in (II) to the applied intumescent coating composition to form a cured intumescent coating can be at least 60° C., such as at least 70° C. The surface temperature of the substrate during applying the pulsed infrared radiation in (II) to the applied intumescent coating composition to form a cured intumescent coating can be in the range of from 60° C. to 100° C., such as from 70° C. to 90° C. The surface temperature of the substrate may be determined by DIN EN 60584-1:2014.

The pulsed infrared radiation according to the present disclosure may have a peak wavelength of at least 3 μm. As used herein, the term "peak wavelength" refers to the maximum emission wavelength of the pulsed infrared radiation. The pulsed infrared radiation used in the method of the present disclosure may have a peak wavelength of 10 μm or less, such as 6 μm or less, or 4 μm or less. The pulsed infrared radiation used in the method of the present application may be in a range between any of the above-mentioned values such as from 3 μm to 10 μm, or from 3 μm to 6 μm, or from 3 μm to 4 μm.

According to the present disclosure, the pulsed infrared radiation can be applied at a pulse duration of at least 5 μs, such as at least 8 μs, or at least 10 μs. As used herein, the term "pulse duration", which is also referred to as "pulse width", refers to the full-width at half maximum (FWHM) amplitude of a pulse of the pulsed infrared radiation. The pulsed infrared radiation can be applied at a pulse duration of 100 μs or less, such as 75 μs or less, or 50 μs or less, or 25 μs or less, or 15 μs or less, or 14 μs or less, or 12 μs or less. The pulsed infrared radiation according to the present disclosure may be applied at a pulse duration in a range between any of the above-mentioned values such as 5 μs to 12 μs, or from 8 μs to 12 μs, or from 10 μs to 12 μs, or 5 μs to 14 μs, or from 8 μs to 14 μs, or from μs to 14 μs, or from 5 μs to 15 μs, or from 8 μs to 15 μs, or from 10 μs to μs, or from 5 μs to 25 μs, or from 8 μs to 25 μs, or from 10 μs to 25 μs, or from 5 μs to 50 μs, or from 8 μs to 50 μs, or from 10 μs to 50 μs, or from 5 μs to 75 μs, or from 8 μs to 75 μs, or from 10 μs to 75 μs, or from 5 μs to 100 μs, or from 8 μs to 100 μs, or from 10 μs to 100 μs.

Particularly, the pulsed infrared radiation according to the present disclosure, which is applied to form a cured coating or a cured self-supporting film or sheet may have a peak wavelength in the range of from 3 μm to 10 μm, such as from 3 μm to 6 μm, at a pulse duration of less than 100 μs, such as less than 25 μs, or less than 14 μs.

The pulsed infrared radiation according to the present disclosure can be applied at a pulse frequency of at least 350 Hz, such as at least 370 Hz, or at least 390 Hz, or at least 400 Hz. As used herein, the term "pulse frequency" refers to the number of pulses per second of the pulsed infrared radiation. The pulsed radiation according to the present disclosure can be applied at a pulse frequency of 450 Hz or less, such as 430 Hz. The pulsed infrared radiation can be applied at a pulse frequency in the range of from 350 Hz to 450 Hz, such as from 350 Hz to 430 Hz, or from 370 Hz to 450 Hz, or from 370 Hz to 430 Hz, or from 390 Hz to 450 Hz, or from 390 Hz to 430 Hz, or from 400 Hz to 450 Hz, or from 400 Hz to 430 Hz. According to the present disclosure, the pulsed infrared radiation can be applied at a pulse frequency in a range between any of the above-mentioned values such as from 350 Hz to 450 Hz, or from 370 Hz to 450 Hz, or from 390 Hz to 450 Hz, or from 400 Hz to 450 Hz.

The pulsed infrared radiation according to the present disclosure can be applied at an impulse energy of at least 250 W/cm², such as at least 270 W/cm², or at least 290 W/cm². As used herein, the term "impulse energy" refers to the total radiant power of electromagnetic radiation received by a surface per unit area. The pulsed radiation according to the present disclosure can be applied at an impulse energy of 350 W/cm² or less, such as 330 W/cm² or less, or 320 W/cm² or less. The pulsed infrared radiation can be applied at an impulse energy in a range between any of the above-mentioned values such as from 250 W/cm² to 350 W/cm², or from 250 W/cm² to 330 W/cm², or from 250 W/cm² to 320
W/cm², or from 270 W/cm² to 350 W/cm², or from 270
W/cm² to 330 W/cm², or from 270 W/cm² to 320 W/cm², or
from 290 W/cm² to 350 W/cm², or from 290 W/cm² to 330
W/cm², or from 290 W/cm² to 320 W/cm².

According to the disclosure, the pulsed infrared radiation
may be provided by an infrared light source comprising a
surface which comprises a ceramic composition. The
ceramic composition can be capable of absorbing heat and
emitting pulsed infrared radiation in particular having a peak
wavelength in the above-mentioned ranges. According to the
present disclosure, an infrared light source may comprise a
surface which comprises a ceramic composition capable of
absorbing heat and emitting pulsed infrared radiation. Suit-
ably, the infrared light source may comprise a surface which
comprises a ceramic composition capable of absorbing heat
and emitting pulsed infrared radiation in the range of 3 μm
to 10 μm. Using of pulsed infrared radiation generated by the
ceramic compositions may provide a positive impact on
curing of the intumescent coating composition according to
the present disclosure.

For curing, the infrared radiation emitting surface of the
infrared light source may face the surface of the substrate
having applied the intumescent coating composition to be
cured or a surface of the self-supporting film or sheet to be
cured. Herein, the distance between the infrared emitting
surface of the infrared light source and the surface of the
substrate having applied the intumescent coating composi-
tion to be cured or the surface of the self-supporting film or
sheet may be at a distance of at least 5 cm, such as at least
10 cm, or at least 15 cm. Herein, the distance between the
infrared emitting surface of the infrared light source and the
surface of the substrate having applied the intumescent
coating composition to be cured or the surface of the
self-supporting film or sheet may be at a distance of 50 cm
or less, such as 45 cm or less, or 40 cm or less, or 35 cm or
less, or 30 cm or less, or 25 cm or less, or 20 cm or less, or
15 cm or less. The infrared radiation emitting surface of the
infrared light source can face the surface of the substrate
having applied the intumescent coating composition to be
cured or the surface of the self-supporting film or sheet at a
distance in a range between any of the above-mentioned
values such as from 5 cm to 50 cm, or from 5 cm to 30 cm,
or from 5 cm to 15 cm, or from 10 cm to 20 cm, or from 15
cm to 25 cm.

According to the present disclosure, the infrared light
source may face the surface of the substrate having applied
the intumescent coating composition to be cured or the
surface of the self-supporting film or sheet at least from one
side. At least one or more infrared light source(s) of the
present disclosure may surround the substrate having
applied the intumescent coating composition to be cured or
the surface of the self-supporting film or sheet at least from
one side. Suitable arrangements of the infrared light source
are described, for example, in EP 1 690 842 A1 (especially
in paragraphs [0044] to [0049]) and WO 2011/015164
(especially on page 12 to 13). The infrared light source
according to the present disclosure may have any desired
shape, such as a shape of a rod, a tube, a flat plate or a curved
plate.

The infrared light source may further comprise a heat
source for directly or indirectly heating up the ceramic
composition. Heat transfer from the heat source may include
various ways of heat transfer, including radiation transfer,
convection, contact transfer or a transfer via thermally
conductive materials in between the heat source and the
ceramic composition. The infrared light source may further comprise a carrier material for heat absorption and/or heat
transfer from the heat source to the ceramic composition.
The carrier material may comprise one or more of the
following materials: Fe; $SiO_2$; $3Al_2O_3 \cdot 2SiO_2$ and/or
$2Al_2O_3 \cdot 1SiO_2$ (mullite); Al or Cu. Further, the infrared light
source may comprise a reflector device. The ceramic com-
position may generate infrared light and emit the infrared
light, inter alia, into an unwanted direction. The reflector
device, which may comprise one or more reflectors, may be
applied to reflect the infrared light emitted in unwanted
directions and re-direct said infrared light in a certain area,
e.g., to the surface of the substrate having applied the
coating composition to be cured or to a surface of the
self-supporting film or sheet to be cured.

The ceramic composition according to the present disclo-
sure may comprise (a) a metal oxide component comprising
(a-i) a metal element selected from the group consisting of
alkaline earth elements, transition metal elements, the lan-
thanides and actinides, and (a-ii) oxygen; and (b) a mullite
remainder component comprising $3Al_2O_3 \cdot 2SiO_2$ and/or
$2Al_2O_3 \cdot SiO_2$ (mullite). Suitable examples of a metal oxide
component (a) include, but are not limited to, $Cr_2O_3$, $ZrO_2$,
$Ho_2O_3$, $Fe_2O_3$, $LaCrO_3$, $CeO_2$, $Y_2O_3$, $YCrO_3$, $Gd_2O_3$,
$MgAl_2O_4$, $MgCrO_4$, $CaCrO_4$, $YCrO_3$, $CuO$, $La_2O_3$, $CuCrO_4$
and $FeCrO_3$. The ceramic composition may consist of a
metal oxide component (a) and a mullite remainder compo-
nent (b).

The ceramic composition can comprise at least 0.1 wt. %
of the metal oxide component (a), such as at least 0.5 wt. %,
such as at least 1.0 wt. %, such as at least 5.0 wt. %, based
on the total weight of the ceramic composition. The ceramic
composition can comprise 70.0 wt. % or less of the metal
oxide component (a), such as 60.0 wt. % or less, such as 50.0
wt. % or less, such as 40.0 wt. % or less, such as 30.0 wt.
% or less such as 20.0 wt. % or less, based on the total
weight of the ceramic composition. The ceramic composi-
tion can comprise the metal oxide component (a) in a range
of from 0.1 to 70.0 wt. %, or from 0.5 to 70.0 wt. %, or from
1.0 to 70.0 wt. %, or from 5.0 to 70.0 wt. %, or 0.1 to 60.0
wt. %, or 0.5 to 60.0 wt. %, or 1.0 to 60.0 wt. %, or 5.0 to
60.0 wt. %, or 0.1 to 50.0 wt. %, or 0.5 to 50.0 wt. %, or 1.0
to 50.0 wt. %, or 5.0 to 50.0 wt. %, or 0.1 to 40.0 wt. %, or
0.5 to 40.0 wt. %, or 1.0 to 40.0 wt. %, or 5.0 to 40.0 wt. %,
or 0.1 to 30.0 wt. %, or 0.5 to 30.0 wt. %, or 1.0 to 30.0 wt.
%, or 5.0 to 30.0 wt. %, or 0.1 to 20.0 wt. %, or 0.5 to 20.0
wt. %, or 1.0 to 20.0 wt. %, or 5.0 to 20.0 wt. %, based on
the total weight of the ceramic composition. According to
the present disclosure, the ceramic composition can com-
prise the metal oxide component (a) in a range of from 0.1
to 70.0 wt. %, such as from 0.5 to 60.0 wt. %, such as from
0.5 to 50.0 wt. %, such as from 1.0 to 40.0 wt. %, such as
from 1.0 to 30.0 wt. %, such as from 5.0 to 20.0 wt. %, based
on the total weight of the ceramic composition.

The ceramic composition can comprise at least 30.0 wt. %
of the mullite remainder component (b), such as at least 40.0
wt. %, such as at least 50.0 wt. %, such as at least 60.0 wt.
%, such as at least 70.0 wt. %, such as at least 80.0 wt. %,
based on the total weight of the ceramic composition. The
ceramic composition can comprise 99.9 wt. % or less of the
mullite remainder component (b), such as 99.5 wt. % or less,
such as 99.0 wt. % or less, such as 95.0 wt. % or less, based
on the total weight of the ceramic composition. The ceramic
composition can comprise the mullite remainder component
(b) in a range of from 30.0 to 99.9 wt. %, or from 30.0 to
99.5 wt. %, or from 30.0 to 99.0 wt. %, or from 30.0 to 95.0
wt. %, or from 40.0 to 99.9 wt. %, or 40.0 to 99.5 wt. %, or
40.0 to 99.0 wt. %, or 40.0 to 95.0 wt. %, or 50.0 to 99.9 wt.

%, or 50.0 to 99.5 wt. %, or 50.0 to 99.0 wt. %, or 50.0 to 95.0 wt. %, or 60.0 to 99.9 wt. %, or 60.0 to 99.5 wt. %, or 60.0 to 99.0 wt. %, or 60.0 to 95.0 wt. %, or 70.0 to 99.9 wt. %, or 70.0 to 99.5 wt. %, or 70.0 to 99.0 wt. %, or 70.0 to 95.0 wt. %, or 80.0 to 99.9 wt. %, or 80.0 to 99.5 wt. %, or 80.0 to 99.0 wt. %, or 80.0 to 95.0 wt. %, based on the total weight of the ceramic composition. According to the present disclosure, the ceramic composition can comprise the mullite remainder component (b) in a range of from 30.0 to 99.9 wt. %, or from 40.0 to 99.9 wt. %, or from 50.0 to 99.5 wt. %, or from 60.0 to 99.0 wt. %, or from 70.0 to 95.0 wt. %, or 80.0 to 95.0 wt. %, based on the total weight of the ceramic composition.

The ceramic compositions can be processed by standard ceramic processing procedure known to a person skilled in the art. The ceramic composition according to the present disclosure may be milled by conventional milling procedures, such as arc milling, to a fine powder, mixed until homogeneity is achieved, and melted, typically at temperatures of 2.600° C. The melting may be carried out in an oxidizing atmosphere, e.g., in air. The resulting melted material may be ground to a grain size, e.g., in the range of 100 to 250 μm and then the powder may be formed into a desired shape. A suitable procedure of processing ceramic compositions is disclosed in, e.g., WO 99/01401 A1. The process of forming the ceramic composition may include high-pressure treatment of the ceramic composition using a press and shaping a formed body of the object to be generated of the ceramic composition. the process of shaping the ceramic composition into an object may further include further temperature treatments, such as sintering process, and, optionally, further pressurizing processes. Shaping of the ceramic compositions to form arbitrary objects may include standard shaping procedures, such as mechanical treatment, powder processes, or ceramic injection molding. Thus, the ceramic composition can be formed by standard ceramic forming procedures into nearly arbitrary shape.

According to the present disclosure, the intumescent coating composition or the cured self-supporting film or sheet may be applied to any substrates known in the art, for example, automotive substrates, marine substrates, industrial substrates, heavy-duty equipment, packaging substrates, lumber, wood flooring and furniture, apparel, electronics including housings and circuit boards and including consumer electronics such as housings for computers, notebooks, smartphones, tablets, televisions, gaming equipment, computer equipment, computer accessories, MP3 players, and the like, glass and transparencies, sports equipment including golf balls, and the like. The substrates to which the intumescent coating composition is applied may comprise a material selected from metals, plastics, ceramics, glass, wood, paper, cardboard, rubber, leather, textiles, an existing coating, or mixtures thereof.

The substrate can be part of a structure or part of a vehicle. "Structure" as used herein refers to any part of a building, bridge, transportation infrastructure, oil rig, oil platform, water tower, power line tower, support structures, wind turbines, walls, piers, docks, levees, dams, shipping containers, trailers, battery components, batteries, and any metal structure that is exposed to a corrosive environment. "Vehicle" as used herein refers, in its broadest sense, to all types of vehicles, such as but not limited to cars, trucks, buses, tractors, harvesters, heavy duty equipment, vans, golf carts, motorcycles, bicycles, railcars, subway cars, airplanes, helicopters, boats of all sizes and the like. The substrate can be part of battery or a part of a battery component.

The present disclosure further relates to a substrate coated according to the method of the present disclosure.

In addition, the present disclosure is directed to an article comprising the substrate coated according to the method of the present disclosure.

The article according to the present disclosure may comprise a battery or a battery component. The battery may be, for example, an electric vehicle battery. According to the present disclosure, the battery may be a lithium-ion battery. As used herein, the term "battery component" refers to any component found in a battery, such as a lithium-ion battery. According to the present disclosure, the battery component may be an electric vehicle battery component. The battery component may comprise an electrode, a battery cell, a battery shell, a battery module, a battery pack, a battery box, a battery cell casing, a pack shell, a battery lid, a battery tray, a thermal management system, a battery housing, a module housing, a module tracking, a battery side plate, a battery cell enclosure, a cooling module, a cooling tube, a cooling fin, a cooling plate, a bus bar, a battery frame, an electrical connection, metal wires, copper or aluminum conductors or cables, or any combinations thereof.

The battery may comprise exterior wall elements defining a housing and optionally interior wall elements, wherein the intumescent coating composition or self-supporting film or sheet is at least partially applied to the external and/or internal side of any of the exterior wall elements and/or to any side of any of the interior wall elements, if present. The exterior wall and/or interior wall elements may comprise composite, steel, aluminum, polycarbonate or combinations thereof.

The battery, in particular lithium-ion battery, may be a battery pack comprising a plurality of individual battery cells, wherein the intumescent coating composition or self-supporting film or sheet is positioned to thermally insulate at least two of the individual battery cells from each other in the expanded and optionally charred state, such as in between two battery cells. The battery may further comprise one or more additional fire-retardant materials and/or fire mitigating means, such as within and/or around the battery. For example, the one or more additional fire-retardant materials and/or fire mitigating means may be wrapped around or otherwise positioned between battery cells, or around the perimeter or interior of the battery housing. Suitable examples for fire-retardant materials and/or fire mitigating means comprise fiberglass, mineral wool, silica, silica fibers, alumina, Kevlar, Nomex, calcium-silicate, calcium silicate fibers, or combinations thereof; these examples can be, for example, in sheet or other self-supported form. Foams could also be used, such as a polyurethane/polyurea foam with flame retardants. Physical barriers can also be employed, such as cooling fins interposed between battery cells, mica boards, aerogel blankets, mineral/glass/carbon fiber-containing blankets or combinations thereof.

The article according to the present disclosure may be a battery or a battery component.

In order to provide fire protection for articles comprising a battery and their users, it is also within the ambit of the present disclosure to apply the coating composition or the self-supporting film or sheet to a part of an article adjacent to the battery between the battery and the article to insulate the article from the battery. In such cases a conventional battery or a battery according to the present disclosure can be employed. the article may be, for example a mobile phone, a tablet or a laptop computer.

Alternatively, the article may comprise a vehicle, such as a hybrid or electric car, bus or truck. In such vehicles it is common to position the battery, especially the lithium-ion battery, due to its weight as a flat battery pack underneath the floor portion of the vehicle body, for example, the car body. In such cases, the intumescent coating composition or self-supporting film or sheet may be applied to the floor portion of the vehicle adjacent to the battery between the battery and the vehicle body. Thereby, in an event of thermal runaway of the battery or a battery fire, the car body, especially the passenger cabin, is protected by the cured intumescent coating or cured self-supporting film or sheet so that the fire will not spread into the passenger cabin and the heat-up of the passenger cabin will be limited for a prolonged period of time so that the passengers will have sufficient time to safely escape from the vehicle in case of such an incident. Alternatively, the article may comprise a structure.

Further, the present disclosure relates to use of an intumescent coating composition according to the present disclosure in a method of curing an intumescent coating composition by applying pulsed infrared radiation. The present disclosure further relates to use of pulsed infrared radiation in a method of curing an intumescent coating composition.

As used herein, unless otherwise expressly specified, all numbers such as those expressing values, ranges, amounts or percentages may be read as if prefaced by the word "about", even if the term does not expressly appear.

The following examples are intended to illustrate the disclosure and should not be construed as limiting the disclosure in any way.

EXAMPLES

Preparation of Intumescent Coating Composition

A coating formulation was prepared using the ingredients shown in Table 1 (base formulation) and Table 2 (hardener formulation).

TABLE 1

| Base formulation | | |
| --- | --- | --- |
| Component | Trade name | Wt. % |
| Bis-phenol F diglycidyl ether | EPIKOTE 8621 | 21.2 |
| Cashew nutshell liquid | CARDOLITE NX-20212 | 2.8 |
| Glass fiber | ChopVantage 31563 | 4.1 |
| Castor oil derivative | THIXATROL ST4 | 0.2 |
| Ammonium polyphosphate | EXOLIT AP 4225 | 15.2 |
| Zinc borate | C-Tec CT ZB 4006 | 31.2 |

[1]Hexion Inc. (USA)
[2]Cardolite Corporation (USA)
[3]Nippon Electric Glass Co., Ltd (Japan)
[4]Elementis Germany GmbH (Germany)
[5]Clariant AG (Switzerland)
[6]The R. J. Marshall Company (USA)

TABLE 2

| Hardener formulation | | |
| --- | --- | --- |
| Component | Trade name | Wt. % |
| (tris-2,4,6-dimethylaminoethylphenol) | Accelerator 960-17 | 1.7 |
| Polyamide amine | Aradur 1408 | 19.0 |
| Castor oil derivative | THIXATROL ST9 | 0.1 |

TABLE 2-continued

| Hardener formulation | | |
| --- | --- | --- |
| Component | Trade name | Wt. % |
| Attapulgite | ATTAGEL 5010 | 1.9 |
| Melamine | AERO MELAMINE 11 | 2.6 |

[7]Huntsman Corporation (USA)
[8]Huntsman Corporation (USA)
[9]Elementis Germany GmbH (Germany)
[10]BASF Formulation Additives (Germany)
[11]Allnex (Germany)

The base for the formulation was prepared by dispersing all the components under a dispersion machine with Brook Crompton motor of 0.75-1 KW at rotation speed of 2000-3000 rpm, and a dispersing plate diameter of 80-90 mm until the sizes of the particles in the formulation were below 100 microns. The hardener for the coating formulation was prepared by dispersing all the components under a dispersion machine with Brook Crompton motor of 0.75-1 kW at rotation speed of 2000-3000 rpm, and a dispersing plate diameter of 80-90 mm until the sizes of the particles in the formulation were below 100 microns. Immediately prior to application, the base and hardener were mixed in the relative amounts shown in Tables 1 and 2. The base and hardener were mixed by a mixer or spatula, until the color of the mixture became homogenous and lump-free. The coating formulation was applied on 150×75×1.2 mm aluminum panels with airless spray application.

Curing of Coated Substrates Using Pulsed Infrared Radiation and Conventional Curing The substrates coated with the intumescent coating composition shown above were cured using the pulsed infrared light source IR.X Infrarot Modul D2 commercially available from SPS Group GmbH (Germany). The following settings of the pulsed infrared light source as shown in Table 3 were applied.

TABLE 3

| Settings of pulsed infrared light source | |
| --- | --- |
| Peak wavelength | 3-4 μm |
| Pulse duration | 12 μs |
| Impulse energy | 320 W/cm$^2$ |

The pulsed infrared light source was facing the substrate having applied the coating composition to be cured at varying distances as shown in Table 4. The light source IR.X Infrarot Modul D2 has a power of 2000 W, when 100% power is applied. Accordingly, 50% power represent a power of 1000 W.

TABLE 4

| Curing conditions | | | | |
| --- | --- | --- | --- | --- |
| Distance | Power | Curing time | Coating Thickness | Sample Temperature |
| 20 cm | 100% | 4 min | 1.0 ± 0.1 mm | 80-90° C. |
| 20 cm | 50% | 14 min | 1.0 ± 0.1 mm | 60-70° C. |
| 30 cm | 100% | 7 min | 1.0 ± 0.1 mm | 60-70° C. |

The curing times represents the times to achieve a cured coating, which is dry enough to handle. Dry enough to handle means the coated surface or film does not show any unwanted marks, detachment, loosening, wrinkling or other forms of distortion when subjected to general handling pressure and can be determined by Shore A hardness tester, of which the value should be larger than 55. The thickness was determined according to DIN EN ISO 2178:2016.

Conventional curing was achieved by using heated air in an oven at 90° C. for 30 min, after which the coating is dry enough to handle. The curing times were significantly higher to achieve cured coatings.

Fire Test of Cured Intumescent Coatings

The coatings applied on 150×75×1.2 mm aluminum panels and cured by pulsed infrared radiation, as well as by curing using an oven and curing at room temperature (~25° C.) were tested against 1200±50° C. torch fire for 10 minutes.

The temperature at the backside of the aluminum panel was monitored. Moreover, the expansion coefficient is determined, which indicates the ratio between the thickness of the char and the cured coating before the fire test. The results are summarized in Table 5 below.

TABLE 5

| | | | Result of fire test | |
|---|---|---|---|---|
| Cure condition | Curing time | Coating thickness | Backside temperature after 5 min at 1200° C. | Expansion coefficient |
| Oven curing 90° C. | 120 min | 1.1 mm | 325 ± 30° C. | 10-12 |
| IR curing 20 cm (50% power) | 30 min | 1.1 mm | 331 ± 30° C. | 10-12 |
| IR curing 30 cm | 20 min | 1.1 mm | 312 ± 30° C. | 10-12 |
| RT curing (Control) | 10 days | 1.1 mm | 320 ± 30° C. | 10-12 |

As can be seen from the above results, curing using pulsed infrared radiation results in similar fire performance of the intumescent coating compared to the conventionally cured intumescent coatings. The curing times can be significantly shortened, while maintaining the fire performances of the cured coatings.

The invention claimed is:

1. A method of imparting fire resistance to a substrate comprising:
    (I) applying an intumescent coating composition to a part of a surface of the substrate; and
    (II) applying pulsed infrared radiation to the applied intumescent coating composition to form a cured intumescent coating wherein the pulsed infrared radiation has a peak wavelength in the range of from 3 μm to 10 μm.

2. The method of claim 1, wherein the intumescent coating composition comprises:
    (a) a film-forming resin;
    (b) a crosslinking agent; and
    (c) a compound providing an expansion gas upon thermal decomposition.

3. The method of claim 2, wherein the film-forming resin (a) comprises an epoxy resin, an acrylic resin, a polyurethane resin, a polyvinyl resin, an urea-formaldehyde resin, a polyimide resin, a melamine resin, a polyester resin, a cyanate resin, a copolymer thereof or a mixture thereof.

4. The method of claim 2, wherein the crosslinking agent (b) comprises a polyamine, a polyamide, a polyepoxide, an aminoplast resin, a phenolic resin, a polyisocyanate, a polythiol, a polyol, a copolymer thereof or a mixture thereof.

5. The method of claim 2, wherein the compound providing an expansion gas upon thermal decomposition (c) comprises melamine, melamine derivatives, guanidine, methylolated melamine, hexamethoxymethyl melamine, urea, dimethylurea, melamine pyrophosphate, dicyandiamide, guanylurea phosphate, glycine, alkaline earth metal carbonate, calcium hydroxide, magnesium dihydroxide, aluminum trihydroxide, expandable graphite or a mixture thereof.

6. The method of claim 1, wherein the intumescent coating composition comprises an epoxy reactive diluent.

7. The method of claim 6, wherein the epoxy reactive diluent comprises a digylcidyl ether of an aliphatic alcohol.

8. The method of claim 1, wherein the intumescent coating composition comprises phosphoric acid, mono- and diammonium phosphate, triphenyl phosphate, tris-(2-chloroethyl)phosphate, tris-(2-chloroisopropyl)phosphate, ammonium polyphosphate, melamine pyrophosphate, or a mixture thereof.

9. The method of claim 1, wherein the intumescent coating composition comprises ammonium pentaborate, boric acid, metal borate, boron oxide, sodium borate, potassium borate, ammonium borate, butyl borate, phenyl borate, or a mixture thereof.

10. The method of claim 1, wherein the intumescent coating composition comprises aluminum hydroxide, aluminum oxide, aluminum chloride, or a mixture thereof.

11. The method of claim 1, wherein the intumescent coating composition comprises fumed silica, quartz, or a mixture thereof.

12. The method of claim 1, wherein the intumescent coating composition comprises $TiO_2$.

13. The method of claim 1, wherein the intumescent coating composition comprises mineral fibers, ceramic fibers, glass fibers, carbon fibers, basalt fibers, or a mixture thereof.

14. The method of claim 1, wherein the intumescent coating composition is applied to the substrate at a dry film thickness ranging of from 0.1 mm to 15 mm or wherein the intumescent coating composition is formed into a self-supporting film or sheet having a dry film thickness ranging of from 0.1 mm to 15 mm.

15. The method of claim 1, wherein the pulsed infrared radiation is applied at a pulse duration of less than 100 μs.

16. The method of claim 1, wherein the pulsed infrared radiation is applied at a pulse frequency of from 350 Hz to 450 Hz or of from 400 Hz to 450 Hz.

17. The method of claim 1, wherein the pulsed infrared radiation is applied at an impulse energy of from 250 W/cm$^2$ to 350 W/cm$^2$.

18. The method of claim 1, wherein the pulsed infrared radiation is applied for a time of less than 25 min to form a cured coating or a cured self-supporting film or sheet.

19. A method of imparting fire resistance to a substrate comprising:
    (I) applying an intumescent coating composition that has been formed into a self-supporting film or sheet to a surface of the substrate; and
    (II) applying pulsed infrared radiation to the self-supporting film or sheet to form a cured intumescent coating; wherein the step of applying pulsed infrared radiation to the self-supporting film or sheet occurs before and/or after the step of applying the self-supporting film or sheet to the surface of the substrate; and wherein the pulsed infrared radiation has a peak wavelength in the range of from 3 μm to 10 μm.

20. The method of claim 19, wherein the self-supporting film or sheet is applied to the surface of the substrate through an adhesive.

\*   \*   \*   \*   \*